United States Patent
Torlo et al.

(10) Patent No.: US 7,840,321 B2
(45) Date of Patent: Nov. 23, 2010

(54) SYSTEM OF CONTROL DEVICES IN A MOTOR VEHICLE WITH PROTECTED DIAGNOSTICS ACCESS POINTS AND METHOD OF USING THE SYSTEM

(75) Inventors: Marc Torlo, Kirchheim (DE); Ulrich Weinmann, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 79 days.

(21) Appl. No.: 12/394,546

(22) Filed: Feb. 27, 2009

(65) Prior Publication Data

US 2010/0191410 A1 Jul. 29, 2010

Related U.S. Application Data

(63) Continuation of application No. PCT/EP2007/007406, filed on Aug. 23, 2007.

(30) Foreign Application Priority Data

Aug. 31, 2006 (DE) ................. 10 2006 040 836

(51) Int. Cl.
*G01M 17/00* (2006.01)
(52) U.S. Cl. .................................. 701/33
(58) Field of Classification Search ............. 701/1, 701/29, 32–36; 713/153–157, 168, 176
See application file for complete search history.

(56) References Cited

U.S. PATENT DOCUMENTS 6,647,323 B1 * 11/2003 Robinson et al. ............. 701/1
7,350,159 B2 * 3/2008 Cencilla et al. ............. 715/854
2004/0073791 A1 4/2004 Vollmer et al.

FOREIGN PATENT DOCUMENTS

WO WO 02/23801 A2 3/2002

OTHER PUBLICATIONS

International Search Report dated Jan. 2, 2008 w/English translation (four (4) pages).

* cited by examiner

*Primary Examiner*—Kim T Nguyen
(74) *Attorney, Agent, or Firm*—Crowell & Moring LLP

(57) ABSTRACT

A system of control devices communicate by way of one or more databuses of a motor vehicle. The system exhibits at least two diagnostics access points, by way of which the state of at least one of the control devices is diagnose~ on the basis of a diagnostics request message; in particular, an error memory entry of a control device is requested by way of one of the diagnostics access points and is transmitted to the outside. A diagnostics request message, which is fed to the system by way of the first diagnostics access point, is recognized as such by an identification and forwarding system and is transmitted to a checking system. The checking system checks at least the authenticity of the diagnostics request messages and, optionally, forwards it to that control device, for which the diagnostics request message is intended.

17 Claims, 3 Drawing Sheets

SYSTEM OF CONTROL DEVICES IN A MOTOR VEHICLE WITH PROTECTED DIAGNOSTICS ACCESS POINTS AND METHOD OF USING THE SYSTEM

CROSS-REFERENCE TO RELATED APPLICATIONS

This application is a continuation of PCT International Application No. PCT/EP2007/007406, filed Aug. 23, 2007, which claims priority under 35 U.S.C. §119 to German Patent Application No. DE 10 2006 040 836.5, filed Aug. 31, 2006, the entire disclosures of which are herein expressly incorporated by reference.

BACKGROUND AND SUMMARY OF THE INVENTION

The invention relates to a system of control devices in a motor vehicle. The control devices communicate by way of one or more databuses of the motor vehicle. Furthermore, the system exhibits at least two diagnostics access points, by way of which the state of at least one of the control devices is diagnosed on the basis of a diagnostics request message; in particular, an error memory entry of a control device is requested by way of one of the diagnostics access points and is transmitted to the outside.

In modern motor vehicles the diagnostics capacity of all control devices is usually implemented and safeguarded by means of a central connecting node to the vehicle. The central connecting node is configured in the vehicle and in this way access is protected in the case of a locked vehicle. Usually the control device of one manufacturer (said control device providing not only physically the diagnostics access points but also ensuring the data integrity of the diagnostics communications and optionally also ensuring that the diagnostics communication is secure outwardly against manipulation) is compatible with the control device of a different manufacturer. If there are a plurality of physical access points, then they are implemented and secured independently of each other in accordance with the prior art.

This method of implementing a plurality of independent diagnostics access points leads correspondingly to greater complexity in the requirements imposed on the control devices as well as in the implementation. In each control device, equipped with a diagnostics access point, commensurate integrity checking mechanisms and the necessary methods for protecting and detecting any potential manipulation of the diagnostics communication have to be implemented. In addition, it may be necessary to select, as a function of the requirements, those resources in the relevant access control device that are necessary with respect to the computing power, data buffer, etc. and that exhibit the requisite capability in order to be able to fulfill the corresponding demand for performance/protection.

In the case of a wireless diagnostics communication system, in which an external attacker introduces radio-based data packages without any physical intervention in the vehicle and, thus, as a consequence information can be read out and possibly altered, each diagnostics package that is transmitted by radio has to be ensured against falsification. Furthermore, it must be possible to prove reliably the authenticity of the authorized external diagnostics unit and/or vehicle. Therefore, each diagnostics package that is transmitted by radio must be checked individually for falsification and authenticity and optionally rejected. Correspondingly, it is necessary to place very strict requirements on the hardware of the control device providing the diagnostics access point. During normal operations (no diagnostics communication), that is, while the control devices carry out their intended functions while the motor vehicle is running, the hardware would not be necessary.

The object of the present invention is to make the known system of control devices in a motor vehicle with at least one diagnostics access point more cost effective.

This and other objects are achieved by a system of control devices in a motor vehicle. The control devices communicate by way of one or more databuses of the motor vehicle. The system exhibits at least two diagnostics access points, by way of which the state of at least one of the control devices is diagnosed on the basis of a diagnostics request message; in particular, an error memory entry of a control device being requested by way of one of the diagnostics access points and being transmitted to the outside. A diagnostics request message, which is fed to the system by way of the first diagnostics access point, is recognized as such by an identification and forwarding system and is transmitted to a checking system. The checking system checks at least the authenticity of the diagnostics request message and, optionally, forwards it to that control device, for which the diagnostics request message is intended.

In contrast to the decentralized security architecture of the prior art, in which each control device with a diagnostics access point has a protection system, a central protection system (or rather checking system) is provided. In addition, the invention provides that a diagnostics request message at the access point to the system of the invention is recognized as such and is forwarded (preferably directly) to the central checking system for verification purposes.

Upon successful verification, the diagnostics request messages are forwarded by the central authority to the respective destination control devices, the state of which is to be diagnosed, and processed by the control devices. The respective answer message (or rather diagnostics messages) are also preferably fed to the central checking system.

In addition, the diagnostics messages are preferably signed and protected against falsification and/or fraud on the part of the sender, before they are transmitted (if expedient, they are also encrypted), to the querying external diagnostics system.

Preferably, the inventive diagnostics access points are at least to some extent wireless access points to the system of control devices, in particular of the type D-CAN, WLAN, channel and/or frequency, by way of which the vehicle key and the vehicle communicate together in conjunction with the disarming of the immobilizer and/or the unlocking of the vehicle doors, GSM, TDMA, or a combination thereof.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
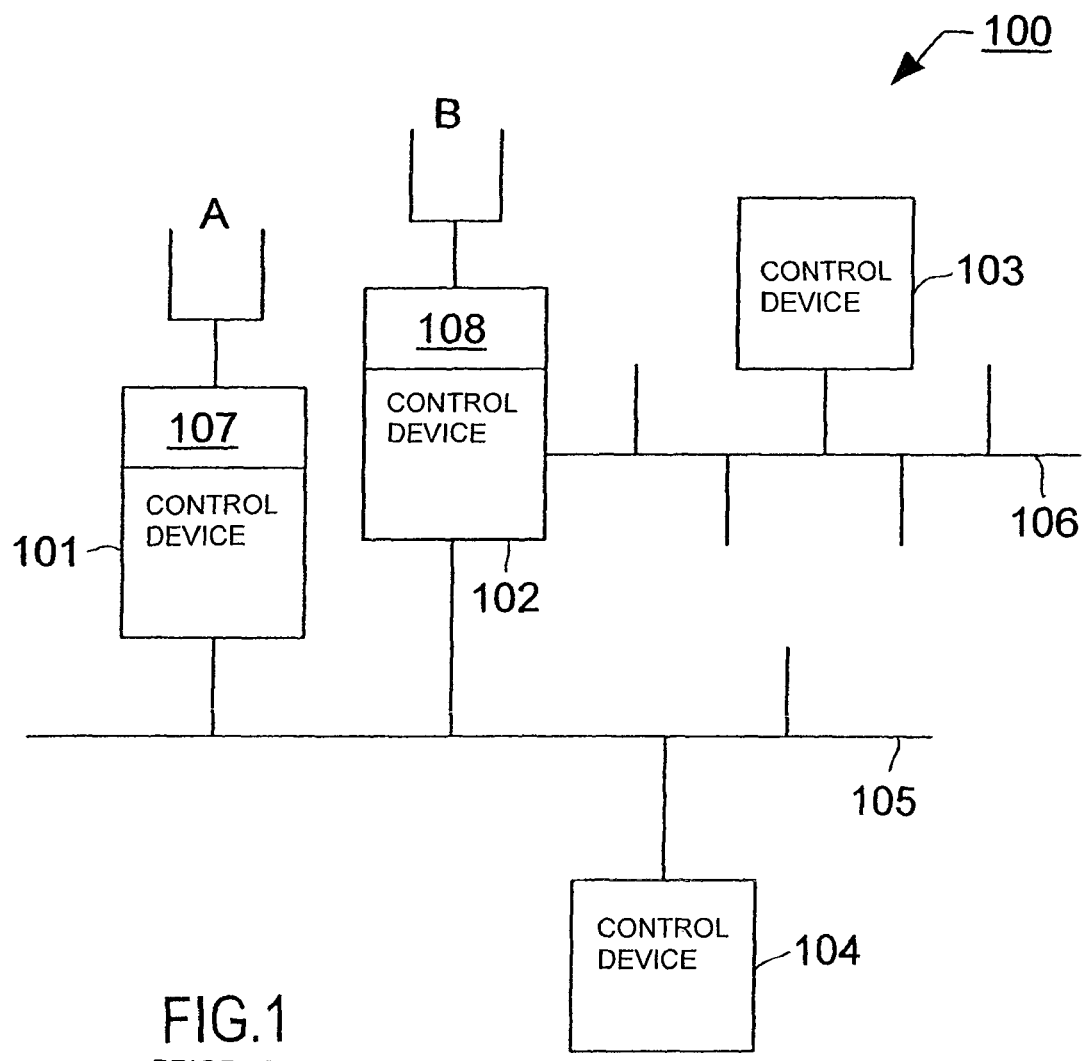
FIG. 1 depicts a known system of control devices of the state of the art, where it is ensured that each access point is protected individually.

A known system 100 includes a plurality of control devices, of which the control devices 101, 102, 103 and 104 are rendered graphically as examples. The control devices 101, 102 and 104 are connected directly to a first databus 105, and the control devices 102 and 103 are connected directly to the second databus. Therefore, the control device 102 exhibits the special feature that it is connected directly to both databuses 105 and 106. In this respect, it is a so-called central "gateway" control device. Each of the control devices 101 and 102 has a so-called "software security layer" 107 or 108, that is, has a very "coarse" checking system for data that pass over the access point A or the access point B directly to the control device 101 or 102, in order to prevent the control devices of the system from being manipulated.

In this case, the access points A and B are physical access points, like a diagnostics socket, which is mounted in the (optionally locked) vehicle and is protected against access. Since the physical access points in the vehicle are protected against unauthorized access, very simple manipulation protection by use of the software security layer 107 or 108 suffices. On performing a diagnosis of the control devices by way of the access points A and/or B, this software security layer loads just very lightly the respective processor of the control devices 101 or 102.

Especially in the case of a configuration of the access points A and B for wireless access to the control devices from outside the system and/or the vehicle by way of an external diagnostics system, an additionally enhanced manipulation protection seems to be advisable.

Figure 2:
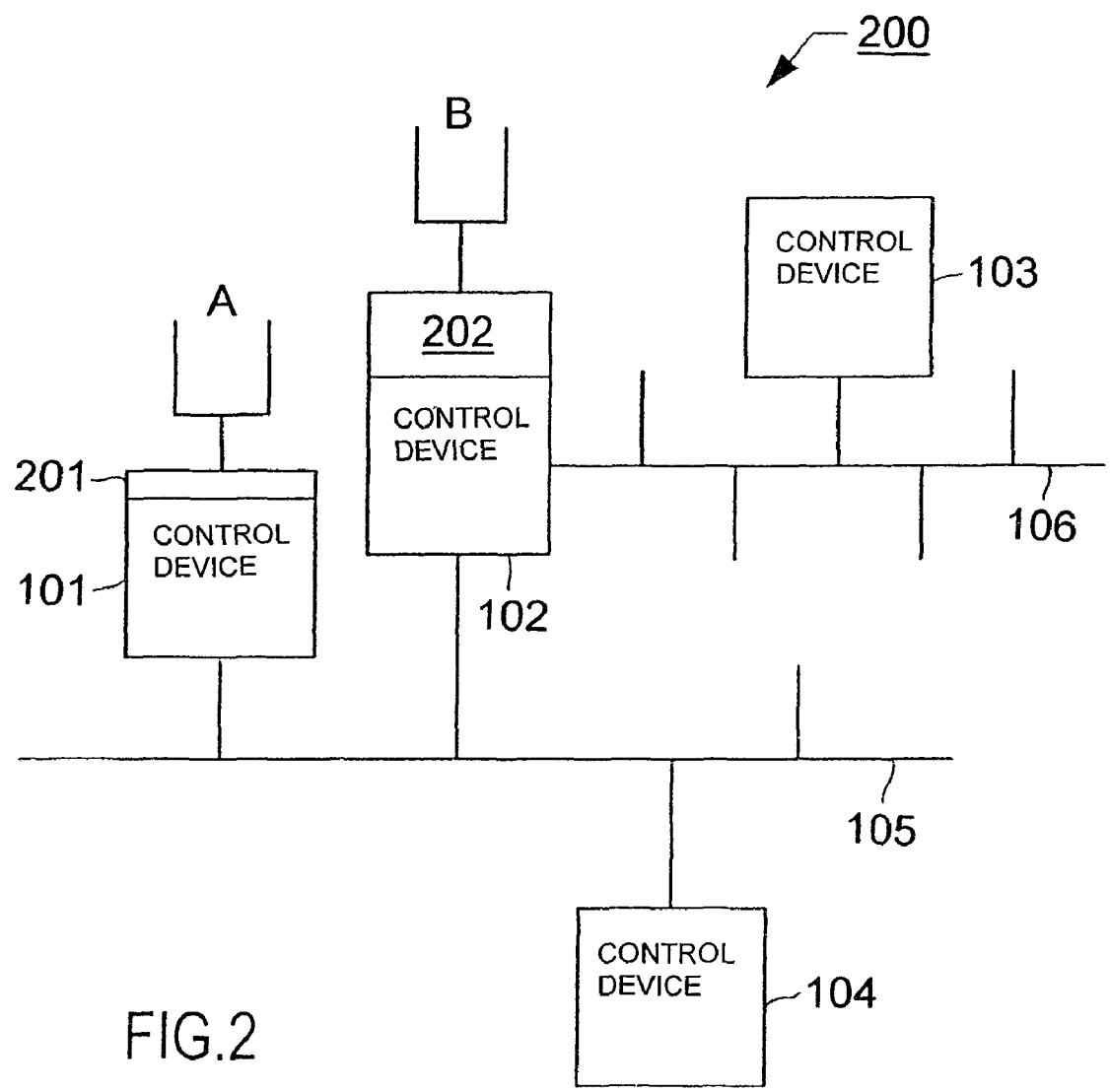
FIG. 2 depicts an inventive system, in which diagnostics request messages are forwarded independently from the access point to a central checking system and are checked there.

FIG. 2 shows an inventive system 200, which differs from the known system 100 in that the control device 101 exhibits, in place of the software security layer 107, an identification and forwarding system 201, which is realized by computer control. That is, according to the invention, the program control of the processor (not illustrated) of the control device 101 has been expanded to such an extent that the correspondingly program-controlled processor forms the identification and forwarding system.

Instead of the security layer 108, a checking system 202, which is realized by program control, is realized, according to the invention, in the control device or rather the central gateway control device 102. That is, the program control of the processor (not illustrated) of the control device 102 has been expanded to such an extent that the correspondingly program-controlled processor forms the checking system.

The function of the identification and forwarding system 201 and the function of the checking system 102 are explained below with reference to FIG. 3.

Figure 3:
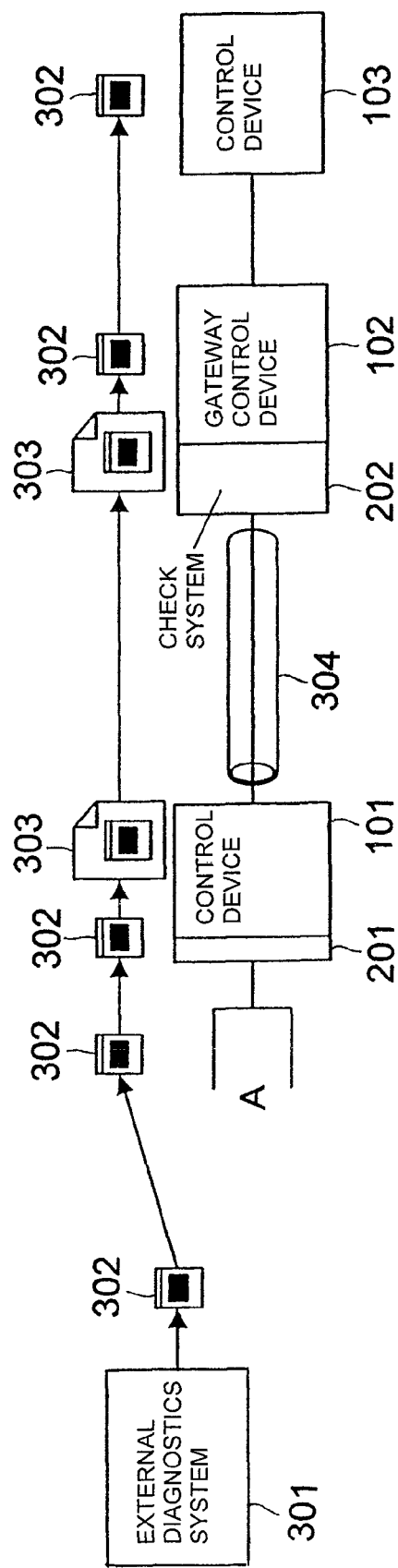
FIG. 3 depicts the path of a diagnostics request message in the inventive system of FIG. 2 from an external diagnostics system to the destination control device.

FIG. 3 shows the path of a diagnostics request message in the inventive system from an external diagnostics system 301 to the destination control device 103.

A vehicle-external diagnostics system 301 transmits wireless—in the embodiment described here over the communications channel, by way of which the vehicle key communicates with the vehicle and vice versa in connection with the disarming of the electronic immobilizer and/or the unlocking of the doors of the vehicle—a diagnostics request message 302, which is "signed" by the diagnostics system, to the access point A. The identification and forwarding system 201 detects that it involves such a message and can determine, for example, within the framework of a first (coarse) check, whether the signature can be assigned to an authorized diagnostics system. To this end, the control device 101 needs just minimal processor power, and the processor (not illustrated) of the control device 101, which is configured according to the invention only for the actual function of the control device, can perform this checking within the framework of the diagnosis using the available processor power.

Following a positive (coarse) check or if this is not provided, following the sole recognition that it concerns a diagnostics request message, the diagnostics request message 302 is provided with information that characterizes the diagnostics request message 302 as such and gives a checking system address. The diagnostics request message 302, which is characterized as such and is provided with a checking system address, is characterized below as the encapsulated diagnostics request message 303. On the basis of the checking system address, the encapsulated diagnostics request message 303 is forwarded directly over a direct communication path of the bus system of the databuses 105 and 106, a so-called tunnel 304, to the checking system 202 of the control device 102 (central gateway control device).

The checking system decrypts, if necessary, the encapsulated diagnostics request message 303, checks the signature and the actual diagnostics request message for integrity and checks whether the sender of the message is authorized to carry out the querying of diagnostics data, in particular the querying of entries in the error memory of a control device.

This procedure is carried out within the framework of the known public key process, in which the public key of the vehicle-external diagnostics system 301 is accessed. The key, which is protected against falsification, is stored in a memory unit of the control device 102.

If the aforementioned checks are positive, the diagnostics request message 302 (or a portion thereof without the signature) is sent to the destination control device 103 by way of the databus 106 and processed by the control device 103.

The control device 103 sends the requested diagnostics message (not illustrated) to the checking system 202, which in turn signs (if necessary, encrypts) the diagnostics message within the framework of a public key process and forwards it to the access point A for wireless forwarding to the vehicle-external diagnostics system 301, which can be located, for example, at the service center of a car dealer or at the remote repair service center of the car manufacturer. During the signing and/or the encryption of the diagnostics message, the process of the control device 102 accesses the secret key of the system 200 and/or the vehicle. On the basis of the use of the public key of the vehicle or rather the system 200, the vehicle-external diagnostics system 301 can check and, optionally, decrypt the integrity and the authenticity and/or the sender of the diagnostics message that is received.

Owing to the described measures of the invention, a cost effective, in particular, wireless diagnosis of the control device of a motor vehicle can be realized. In this respect, the diagnosis meets stringent security requirements. The system, according to the invention, requires only a central checking system that delivers the optionally high processor power and performance. In addition, the known design of a plurality of external access points to the system may be retained.

Preferably, the central gateway control device activates, according to the invention, the checking system during the diagnostics process.

In contrast to other control devices of the system, the central gateway control device usually provides, by reasons of its intended functions, high processor power and performance while the motor vehicle is running. This processor power and performance can be used during the diagnostics process without incurring any additional costs in order to satisfy the high security requirements that are imposed on the security against manipulation during the diagnostics process.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A diagnostic system for a motor vehicle, the system comprising:
    a plurality of control devices arranged in the motor vehicle, said control devices communicating by way of one or more databuses of the motor vehicle;
    at least two diagnostics access points by way of which a state of at least one of the plurality of control devices is diagnosed as a function of a diagnostics request message, wherein an error memory entry of the at least one control device is requested through one of the at least two diagnostics access points for transmission outside of the motor vehicle;
    an identification and forwarding system associated with a control device, wherein the diagnostics request message fed to the system via the one diagnostics access point is recognized as a diagnostics request message by the identification and forwarding system; and
    a checking system associate with another one of the control devices, wherein the identification and forwarding system transmits a recognized diagnostics request message to the checking system, which checking system checks at least for authenticity of the diagnostics request message prior to forwarding the diagnostics request message to an intended control device.

2. The system according to claim 1, wherein at least one of said at least two diagnostics access points is a wireless access point utilizing a wireless protocol.

3. The system according to claim 2, wherein the wireless protocol is one of: D-CAN, WLAN, GSM, TDMA, CDMA, and/or a channel and/or frequency, by way of which a vehicle key and the motor vehicle communicate together in conjunction with disarming of an immobilizer and/or an unlocking of vehicle doors.

4. The system according to claim 1, wherein the checking system checks for at least one of the following:
    (a) the authenticity of the diagnostics request message based upon a signature of the diagnostics request message;
    (b) whether a sender of the diagnostics request message is authorized; and
    (c) whether the diagnostics request message is decrypted.

5. The system according to claim 1, wherein the checking system comprises a program-controlled processor, said processor checking the diagnostics request message via a public key process, wherein a public key stored in the vehicle securely against falsification is accessed.

6. The system according to claim 1, wherein one of the control devices is coupled directly to first and second databuses, said one control device being a central gateway control device; and
    wherein a processor of the central gateway control device functions as the checking system under program control.

7. The system according to claim 1, wherein upon receipt of the diagnostics request message by the intended control device, a diagnostics message of the intended control device is transmitted to the checking system, which checking system provides the diagnostics message with a signature and transmits it through one of the diagnostics access points to an external diagnostics system.

8. The system according to claim 7, wherein the signature is an encryption of the diagnostics message.

9. The system according to claim 7, wherein the signature is carried out by applying a public key process.

10. The system according to claim 9, wherein the public key process utilizes a secret key stored securely in the vehicle.

11. The system according to claim 1, wherein a first check of a diagnostics request message received in the motor vehicle is performed at the diagnostics access point.

12. The system according to claim 11, wherein the identification and forwarding system comprises one of the control devices operatively configured between the diagnostics access point and one of the first and second databases, wherein a processor of the one control device is programmed so as to perform the first check.

13. The system according to claim 1, wherein a first check of a diagnostics request message received in the motor vehicle is performed in the identification and forwarding system.

14. The system according to claim 13, wherein the first check performed by the identification and forwarding system is a check of a signature of the diagnostics request message.

15. A method of diagnosing a control device in a motor vehicle having a plurality of control devices communicating via first and second databases of the motor vehicle and at least two diagnostic access points that receive diagnostics request messages, the method comprising the acts of:
    receiving, via a first diagnostic access point, a diagnostics request message;
    recognizing the diagnostics request message as a diagnostics request message via an identification and forwarding system performed by one of the control devices;
    transmitting the recognized diagnostics request message from the one control device to a checking system;
    verifying at least an authenticity of the diagnostics request message in the checking system, said checking system being configured as part of another one of the control devices that functions as a gateway control device directly coupled to the first and second databases of the motor vehicle; and
    forwarding the diagnostics request message to an intended control device for diagnosis.

16. The method according to claim 15, further comprising the acts of:
    receiving the diagnostics request message by the intended control device;
    transmitting a diagnostics message from the intended control device to the checking system;
    applying a signature and/or encryption to the diagnostics message in the checking system; and
    transmitting the signed and/or encrypted diagnostics message from the checking system through one of the diagnostics access points to an external diagnostic system.

17. The method according to claim 16, wherein the signing and/or encryption of the diagnostics message is performed utilizing a public key process, wherein a secret key is stored in the vehicle.

* * * * *